United States Patent [19]

Brame

[11] 4,224,669
[45] Sep. 23, 1980

[54] MINIMUM SAFE ALTITUDE MONITORING, INDICATION AND WARNING SYSTEM

[75] Inventor: Frank H. Brame, Redmond, Wash.

[73] Assignee: The Boeing Company, Seattle, Wash.

[21] Appl. No.: 863,077

[22] Filed: Dec. 22, 1977

[51] Int. Cl.$^2$ .......................... G01C 5/00; G08G 5/04
[52] U.S. Cl. .............................. 364/433; 340/27 NA; 343/7 TA; 364/449; 364/460
[58] Field of Search ............... 364/433, 460, 443, 444, 364/449, 445; 340/27 AT, 27 NA, 27 R; 343/7 TA, 7 ED

[56] References Cited

U.S. PATENT DOCUMENTS

| | | | |
|---|---|---|---|
| 3,133,439 | 5/1964 | Luskin | 73/178 |
| 3,373,423 | 3/1968 | Levy | 343/7 ED |
| 3,404,398 | 10/1968 | Hoban et al. | 343/7 ED |
| 3,652,836 | 3/1972 | Richardson et al. | 364/445 |
| 3,749,335 | 7/1973 | Williams | 364/443 |
| 3,946,358 | 3/1976 | Bateman | 340/27 R |
| 3,988,735 | 10/1976 | Bennett et al. | 340/27 NA |
| 4,024,539 | 5/1977 | Quinlivan et al. | 343/7 TA |
| 4,030,065 | 6/1977 | Bateman | 340/27 AT |

OTHER PUBLICATIONS

Klass: New Guidance Technique Being Tested, Aviation Week and Space Technology, Feb. 25, 1974, pp. 48/51.

Primary Examiner—Felix D. Gruber
Attorney, Agent, or Firm—Christensen, O'Connor, Johnson & Kindness

[57] ABSTRACT

A geographically referenced minimum safe altitude monitoring, indication and warning system involving use of a navigation computer in conjunction with a memory device storing predetermined minimum safe altitude data as a function of geographic location. The stored data takes into account both natural terrain and man made flight hazards in a mosaic of geographic grid sections covering the navigational territory of interest, and it either arbitrarily assumes in such data "worst case" flight conditions, or one or more actual current conditions of vehicle course, velocity and altitude change rate in providing the system output whether in an airplane, submarine or other vehicle so as to indicate to the pilot or warn the pilot of existing minimum safe altitude or imminent approach to an unsafe altitude.

14 Claims, 4 Drawing Figures

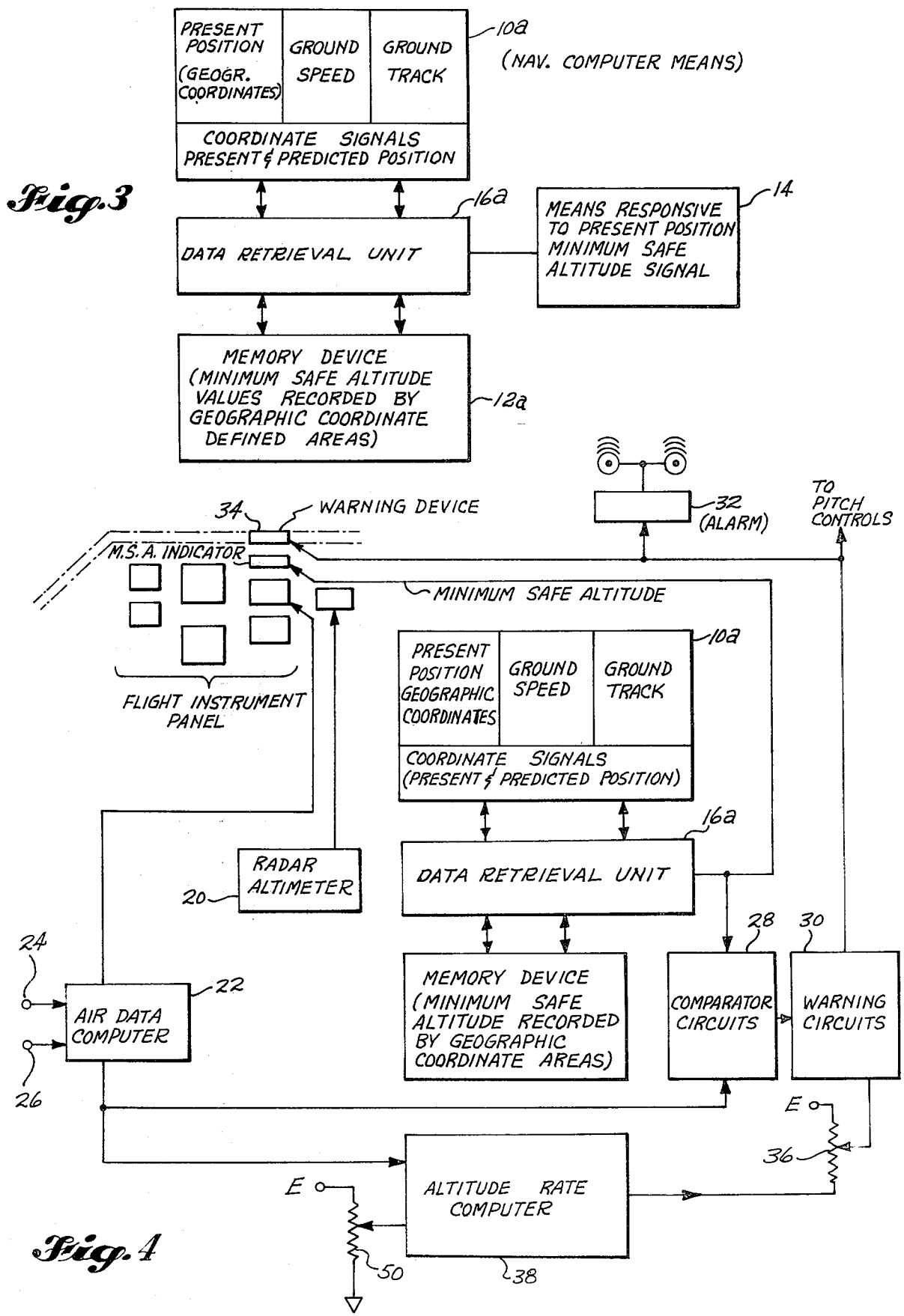

MINIMUM SAFE ALTITUDE MONITORING, INDICATION AND WARNING SYSTEM

BACKGROUND OF THE INVENTION

This invention relates to improvements in aircraft flight safety control systems and more specifically to a minimum safe altitude display and warning system which automatically signals to the pilot on an ongoing basis existing or imminent flight altitude requirements in order to avoid hazard situations. The invention which may be applied to submarines, as well as airplanes, for example, is herein illustratively described by reference to its presently preferred forms as applied to aircraft and as used in conjunction with currently available navigational computer technology and related instrumentation. However, it will be recognized that certain modifications and changes therein with respect to details may be made and that the invention may be embodied in a variety of forms without departing from the essential features involved.

A survey of prior art proposals potentially of interest as background to this invention, revealed the following prior art U.S. Pat. Nos.: 2,568,568, 3,113,306, 2,585,605, 3,231,887, 2,606,317, 3,246,326, 2,809,340, 3,328,795, 3,060,426, 3,705,306, 2,582,588, 3,805,261, 3,680,046.

Of the foregoing patents, the following are believed to be representative of the group in providing an indication of the state of the background art of interest herein.

U.S. Pat. No. 3,113,306 discloses a fuel saving system involving a precalculated trip altitude and vertical speed profile with deviation monitoring to make appropriate enroute corrections in flight so as to permit the aircraft to fly over a selected destination point at preselected altitude.

U.S. Pat. No. 3,328,795 discloses a fix-taking or place-finding guidance system using quantized topographic elevation data taken as a sequence of discrete elevation readings at selected points during vehicle travel. Position is determined for navigational purposes by comparison matching of these sequential altitude values with prerecorded sequences also in quantized form in the computer memory bank. Present position is determined on the basis of "best fit" of the sequence patterns being compared. U.S. Pat. No. 3,805,261 is generally of a similar nature.

U.S. Pat. No. 3,582,588 discloses a navigational system with a moving recording medium representing aircraft motion associated with means indicating altitude clearance and a means indicating oncoming elevation hazards of which the pilot should be made aware in order to take appropriate avoidance measures.

In U.S. Pat. No. 3,680,046 an assigned or command altitude corridor is set by the crew using thumbwheel switches converting the altitude corridor into digital form which is compared with a digital representation of existing altitude using BCD logic to produce altitude deviation warnings.

A broad object of this invention is to provide an improved minimum safe altitude indication and/or warning system that substantially avoids all necessity associated with prior practices of relying upon the pilot's observations, judgments and responses relative to ground hazards when attempting to reduce altitude safely and to follow a safe course at low relative altitude. A related object is to remove the added strain and associated responsibility with attendant risk of human error placed upon the pilot under those conditions regardless of whether or not radar guidance or other hazard detection or course directing equipment or personnel are available to assit. The risk, of course, becomes extreme under poor visibility conditions, and yet, sometimes that risk is taken because of operational mistakes or imperative demands to reduce altitude in making final approaches.

In accordance with the present invention, by continuously indicating to the pilot what is the minimum safe altitude and/or warning the pilot of imminent descent below minimum safe altitude and by basing the determinations thereof on data that is as reliable as the navigation computer itself and other basic instrumentation, which data already incorporates or is based upon "worst case" conditions, the necessity of maintaining a collision "watch" and exercising low altitude hazard avoidance judgments is minimized and the pilot can direct his principal focus of attention upon other vital tasks.

In effect, the invention provides to the pilot ongoing information that assures keeping the aircraft out of trouble from the standpoint of ground hazards, while permitting the aircraft to be flown as low as safely permissible within that specification. A related object hereof is to provide an ongoing monitor and indication of minimum safe altitude that combines the reliability of geographically based prerecorded present position altitude data and projected position altitude data with the reliability of navigation computer coordinate derivations.

A more specific object hereof is to provide a system which may be implemented in a non-tactical or universally applicable form or alternatively in a tactical form in which the prerecorded minimum safe altitude data is utilized in conjunction with such variable factors as ground speed and ground track as well as altitude change rate in order to provide a higher degree of resolution in interpreting the prerecorded data allowing the aircraft to fly safely at even lower indicated minimum safe altitudes. In either design approach, the prerecorded minimum safe altitude data is based on actual terrain features precisely located in terms of geographic coordinates and related to other terrain features similarly determined for location. These are accounted for in the anticipatory or course projection determinations necessary to assure that an aircraft in any given position can be safe only if above a certain minimum altitude. Thus the determinations allow for terrain features immediately ahead in whatever direction and at whatever velocity the aircraft may be proceeding.

These and other objects and advantages of the invention will become more fully evident from the description that follows

BRIEF DESCRIPTION OF THE INVENTION

This invention achieves its objectives by combining the basic capabilities of conventional navigational computer means, operable to produce coordinate signals ongoingly related to present position of the vehicle, with data storage means in which is recorded by reference to geographic coordinates predetermined minimum safe altitude values for all points or grid sections that together make up or cover the geographic territory over which the vehicle may navigate. In its rudimentary form the system is completed by a data retrieval unit capable of utilizing the aforesaid coordinate signals on an ongoing basis as the flight progresses automatically to retrieve the currently applicable data from such storage means and present it in an output. In a rudimentary form of the system the prerecorded values of minimum safe altitude reflect not only man made or terrain obstacle features, but also "worst case" flight assumptions for an aircraft as it flies over each grid section. According to such "worst case" assumptions, for example, the aircraft may be located at any point in the grid section, it may be flying at any expectable velocity, it may follow (or change direction to) any expectable course, and it may be descending at any expectable rate. The predetermined, recorded minimum safe altitude for the section, then includes not only allowance for the terrain within the section, but also for the terrain in adjacent sections within an arbitrarily selected range, regardless of direction of flight out of the section.

As a further feature of the invention, the coordinate signals are further related to aircraft ground speed and ground track. In making use of such data, at least some of the "worst case" assumptions referred to immediately above are eliminated from the prerecorded minimum safe altitude data values for the respective sections and, instead, actual case conditions are utilized with respect to those factors (i.e., ground speed and track). As a result, the aircraft is given more tactical freedom by the greater degree of ground hazard resolution capability allowed in the selection of recorded minimum safe altitude values. As a result lower minimum safe altitudes can often be presented as available to the pilot that in the rudimentary system are foreclosed because of the necessity in "worst case" planning to allow for any course heading and for any speed. Similarly, additional resolution may be achieved by taking into account present negative rate of change of altitude, if any, instead of assuming the "worst case" possibility of the rudimentary system. The added refinement provides still another basis in many situations to present a lower minimum safe altitude as being "available" at different times along a route.

By comparing minimum safe altitude determinations produced by the monitoring system with actual altitude of the aircraft and detecting when the difference becomes smaller than a predetermined value, visible, audible or other sensory perception warning systems may be actuated, drawing the pilot's attention to the situation. Likewise, the system may include provisions by which these warning indications may be adjustably advanced, for example, automatically in proportion to rate of descent of the aircraft, to avoid risk of overshoot to unsafe levels.

These and other features of the invention, including combinations of features thereof, will be evident from the more detailed description that follows by reference to the accompanying drawings.

BRIEF DESCRIPTION OF DRAWINGS

FIG. 3 shows a somewhat more tactically oriented version of the system shown in FIG. 1, and FIG. 4 shows a still more elaborate or refined system, adding additional features.

DETAILED DESCRIPTION OF ILLUSTRATED EMBODIMENTS

Figure 1:
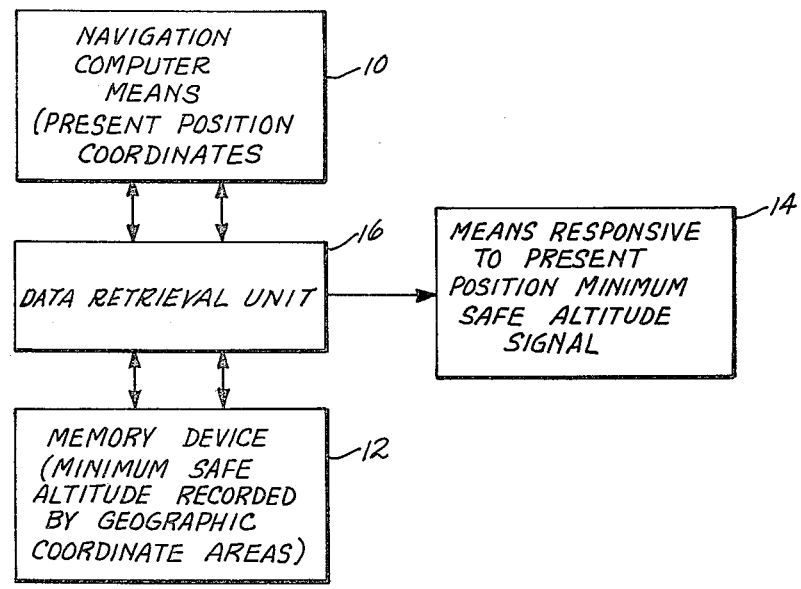
FIG. 1 is a block diagram of the improved minimum safe altitude monitoring system in a rudimentary form.

The comparatively rudimentary system embodiment depicted in FIG. 1 is intended for applications which, in effect, are nontactical, i.e., the least demanding for high resolution and continuous updating of actual minimum safe altitude determinations. Its readings and/or warnings are universally applicable to all aircraft contemplated when computing the minimum safe altitude values recorded, and to all flight conditions (i.e., velocity, track heading, etc.). For purposes of contrast, for example, a tactically oriented system of this invention would apply to high-speed low-level strategic military flight minimum safe altitude monitoring wherein all possible measures must be taken to permit the aircraft to fly safely as low as possible utilizing all available means to resolve and compute the effect of oncoming ground hazard conditions in relation to navigational position and predicted position of the aircraft.

In the case illustrated in FIG. 1, minimum safe altitude monitoring requirements are met by recording, retrieving and utilizing minimum safe altitude data on a gross area or low geographic resolution basis. In such a system, as flight progresses along a chosen route, currently applicable minimum safe altitude data recorded in memory device 12 for successive discrete geographic areas being traversed is selectively retrieved from the memory device by data retrieval unit 16 based on present position coordinate signals received from navigation computer 10. This is performed as an ongoing function providing either a continuous or intermittent output that may be used in performing an indication, warning or control function in the aircraft (i.e., such as automatic command to thrust and attitude control to increase the aircraft's altitude). Memory device 12 may be of any suitable or conventional type capable of recording such data. Examples of suitable memory devices for this purpose can be found in core memory storage systems, tape memory storage systems or disc memory storage systems. In the memory device 12 the specific values of minimum safe altitude are systematically stored to be accessed selectively through the appropriate channels of the device, such as by way of digital registers which are organized pursuant to the system of geographic grid lines employed to divide up the total navigational geographic area for which the system is applicable. This may be accomplished in any suitable manner using known technology or special technology to be developed for the purpose, all as will be readily obvious to persons skilled in the design and use of memory devices. The same applies with respect to the nature and functioning of the data retrieval unit 16 or its equivalent as a means responsive to present position coordinate signals derived from the navigational computer 10 to selectively interrogate or access the memory device 12 in order to retrieve the currently applicable values of minimum safe altitude at different times during the progress of the vehicle on its flight route.

No attempt is made in FIG. 1 to depict a particular form of response means 14 by which or through which the retrieved data value of present position minimum safe altitude is put to any specific end use. As previously stated, such end uses may vary. For example, the response means 14 may comprise or activate a present position minimum safe altitude display that the pilot and/or other crew members can read on the instrument panel of the aircraft. The display may be either digital or galvanometric in form. Alternatively, the response means 14 may comprise or activate a sensory perceptible warning device that compares existing altitude with minimum safe altitude and responds to an excessive difference so as to warn the pilot of the approaching harzard condition.

With continued reference to the system of FIG. 1, more specifically the total geographical navigational area of interest is effectively divided by a grid system into discrete geographic areas or sections, each represented in a corresponding memory "cell" or place in storage device 12. A single data value representing minimum safe altitude for each area is determined and prerecorded in the respective memory cells of device 12. Each such data value thereby represents minimum safe altitude for any present position of the aircraft within the effective boundaries of the related geographic grid section or area.

The selection of these individual area minimum safe altitude values, as well as the choice of grid line spacings defining the inidividual areas, based essentially on an optimizing of the priorities given to three interrelated, and to some extent, competitive design objectives:

1. The desire to have minimum safe altitude values recorded be as nearly true safe minimums as feasible.
2. The practical consideration of limiting the total number of discrete memory elements or cells required in an overall system so as to keep the size and cost of the memory storage device within reasonable bounds. Here, however, it should be noted that current progress in the art is making the size and cost of "memory" capacity in apparatus of this nature rapidly smaller, so that in time there may be no practical limitation of this nature on the number of memory elements that can be used economically in the system, and hence, no practical limitation on the degree of geographic resolution applicable to the recording and retrieval of minimum safe altitude data on a section by section basis.
3. The possible need, particularly when the system is designed for a coarse grid mosaic (e.g., with area-defining grid lines widely spaced), to adjust upwardly at least some of the area minimum safe altitude values so as to avoid an excessive amount of increase in the recorded minimum safe altitude value that can occur at the instant of crossing a grid section line. If the monitor (system output) abruptly demands much higher minimum safe altitude in the section being entered by the aircraft, the resultant altitude maneuver required of the pilot in attempting to comply with the change could be uncomfortable and perhaps in itself constitute a form of danger, such as possible disregard to the system itself and a return to dead reckoning methods. Avoidance of such a problem is readily achieved to the extent necessary in a given design, however, simply by arbitrarily increasing the recorded value of minimum safe altitude associated with those grid section areas adjoining others for which the value is much higher, thereby providing a moderating or dampening effect on the overall pattern of section by section prerecorded minimum safe altitudes.

However, before reaching the question of making adjustments of the nature discussed immediately above, basic determinations must be made of minimum safe altitude values to be recorded for all the respective geographic areas or grid sections represented. In so doing, these values are determined in relation to a number of factors hereinafter discussed and the observance of which forms a complete and omnibus basis for the pilot of the aircraft in maintaining flight above minimum safe altitude. This avoids the need to maintain a personal watch for, or to make personal observations of instrument indications of coming specific hazards and the like under conditions requiring rapid response to avoid impact. The pilot now can safely assume under all expectable conditions that by heeding the monitor the aircraft will be above safe altitude and still be permitted to fly as low as it safely can at all times.

To achieve these ends in the rudimentary system described in FIG. 1, the following factors and "worst case" considerations are taken into account in determining the prerecorded values to be assigned as minimum safe altitude values for each of the respective grid sections:

a. the aircraft's present position may be anywhere within the grid section.

b. The aircraft may be following any ground track (or may manuever to change to any ground track) while within the grid section.

c. The aircraft may be flying at maximum expectable speed.

d. The aircraft may be descending at maximum expectable rate.

e. The time lag for the pilot and aircraft to execute a given change of climb rate may be the maximum expectable.

Figure 2:
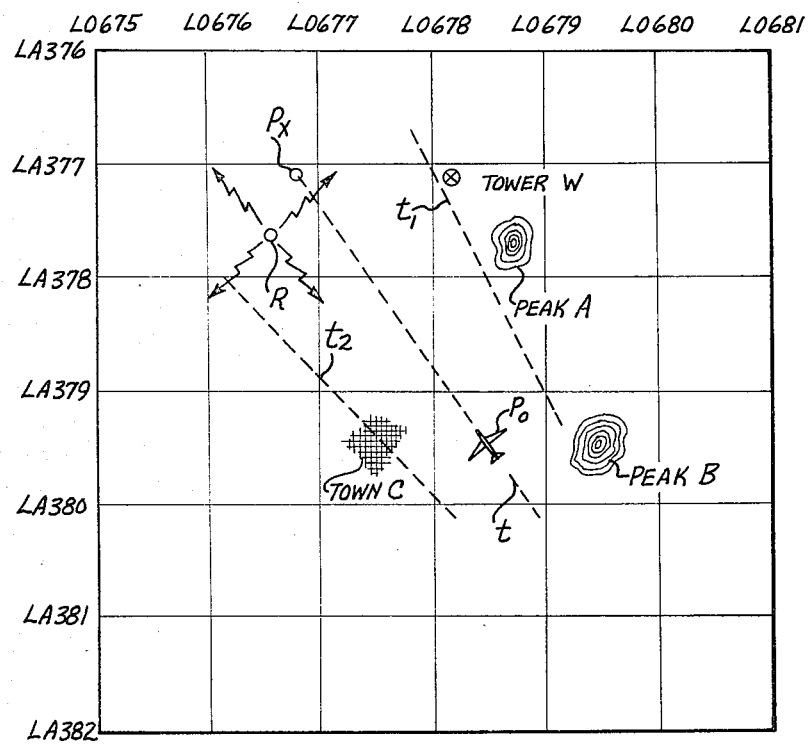
FIG. 2 is a map-like representation of a geographic mosaic of sections defined by latitude and longitude grid lines that may be used along with the terrain features or flight hazards therein for the purpose of determining minimum safe altitude value for the respective sections or areas.

The significance of the considerations and factors enumerated immediately above is illustrated in the design and operation of the FIG. 1 system by reference to FIG. 2. In this figure, longitude grid lines are designated LO1, LO2, etc., whereas latitude grid lines are designated as LA1, LA2, etc., (starting from territorial edges not shown). These latitude and longitude grid lines make up a mosaic of geographic areas in the form of square grid sections of selected size, such as one mile square. Other geometric shapes could also be used for the sectioning if desired. In the illustration, elevation-critical features include a high tower W and a mountain peak A in section LO678, LO679-LA377, LA378. An airplane at point $P_0$ in section LO678, LO679-LA379, LA380 is shown flying on ground track t. On this particular ground track, no notable elevation hazards are imminent in the present position section or in the next two succeeding sections in any direction of flight that would present an altitude hazard above some preselected reference level. That reference level would be typically the minimum required flight altitude level for the general vicinity. Yet in determining what is to be the assigned minimum safe flying altitude for the aircraft in its particular present position shown in the figure for the rudimentary system design under consideration, the presence of the town C (with possible high buildings and the like) and peak B representing another potential hazard in next adjacent sections are both considered, as is the presence of tower W and peak A, two sections away. This is the case because minimum altitude selection assumes arbitrarily that not only could the aircraft be at any location in the section, but it could be on any ground track, and it is desired that the determination be universal, that is, applicable to all flight conditions. Stated otherwise, under the above enumerated worst-case assumptions relating to the position of the aircraft, potential course changes, maximum speed and response time required to execute corrective maneuvers, the obstacles in establishing the minimum safe altitude for each grid section include those obstacles lying within a region whose boundary is the locus of a point which is a predetermined distance from the latitudinal and longitudinal edges of that particular grid section. For example, assuming a maximum expectable aircraft speed that allows traversal of more than two grid section during a preselected time interval, the minimum safe altitude that is stored in memory device 12 for grid section LO678, LO679-LA379, LA380 of FIG. 2 is the altitude necessary for safe overflight of the highest obstacle among tower W, peak A, peak B, and town C. Thus, if an emergency develops or plans suddenly change and the aircraft is required to change course and/or speed, the minimum safe altitude reading still applies. Thus the pilot is assured he can safely change course at any time without concern for new obstruction hazards to consider.

Any of different available position tracking navigation devices can be employed to provide aircraft position coordinate signals for purposes of the system of FIG. 1. Preferably, of course, these signals are provided in binary code for convenience in accessing the minimum safe altitude data values stored by digital code indexing in memory device 12.

In the revised or more tactically refined embodiment shown in FIG. 3, it becomes possible in the selection and prerecording of minimum safe altitude values for the respective grid sections to omit "worst case" assumptions b and c listed above in connection with the discussion of FIG. 1. Instead, utilizing the facilities of conventional navigation computer means 10a, present ground track and present ground speed are determined along with present position geographic coordinates to produce present position coordinate signals. By simple projections of this data, predicted position coordinate signals are produced based on a selected flight time interval out of present position, such as one minute. These sets of digitally coded coordinate signals are applied by the data retrieval means 16a to retrieve from the corresponding "slots" or cells of the memory device the recorded values of minimum safe altitude for the respective grid sections encompassing present position, predicted position within the flight time interval selected together with those in between along the present ground track. As an additional allowance or margin for error or potential limited change of ground track direction within said selected interval, computer 10a can also be programmed to provide the coordinate signals of grid sections intersected by lateral zones on either side of projected ground track t (i.e., between lines $t_1$ and $t_2$) and thereby require correlator 16 to retrieve their respective recorded values of minimum safe altitude as well. The highest one of those recorded values of minimum safe altitude thus retrieved from memory 12a is then automatically selected by the data retrievel means 16a, in order to provide the controlling output that operates the response means 14. It thus becomes possible at some points or in some areas along a route with the system of FIG. 3 for tactical purposes, to fly lower at the indicated value of minimum safe altitude than in the system of FIG. 1. This is true because it is not necessary to take into account items b and c mentioned above and, consequently, terrain features in grid sections off to the side or behind the aircraft.

Thus, in terms of FIG. 2, the system of FIG. 3 predicting a position $P_x$ for the aircraft within a selected flight time interval, such as the next minute of flight from present position $P_0$, operates through data retrieval means 16a to retrieve from the memory device 12 the recorded minimum altitude values only for those sections up to and including position $P_x$ along the projected ground track. Preferably, as indicated above, this ground track is translated as a widened or divergent band of potential positions for the aircraft within the boundary lines $t_1$ and $t_2$ centered on projected ground track t so as to allow margin for error or change of course. In this example, therefore, the minimum safe altitude values to be retrieved and compared for selection of that which is greater includes those recorded for the following grid sections.

LA379, LA380-LO678, LO679, LA377, LA378-LO677, LO678, LA379, LA380-LO677, LO678, LA378, LA379-LO676 LO677, LA378, LA379-LO678, LO679, LA377, LA378-LO676, LO677, LA378-,LA379-LO677,LO678, LA376,LA377-LO677,LO678, LA377,LA378-LO678,LO679.

In the system shown in FIG. 4, present altitude is provided by a suitable means such as a conventional air data altitude computer 22 responsive to pilot-static source inputs 24 and 26 representing total pressure and static pressure, respectively. The present altitude signal produced by computer 22 is in the form either of a digital value or an analog value fed to conventional comparator 28. The latter also receives a present position minimum safe altitude signal from data retrieval means 16a. Either in the comparator or in the respective signal sources feeding the comparator as mentioned, appropriate circuit arrangements assure that the signals are in comparable terms or form enabling the comparator to subtract one value from the other so as to produce a difference signal or output that is compared in a warning circuit 30 against a reference value. In the example, intended solely for purposes of illustrating desired functions, the reference value is produced as the output of a selectively variable reference potentiometer 36. When the difference between the reference value signal and the difference signal produced by the comparator drops to a predetermined level sensed in the warning device 30, the warning device operates to trigger an audible alarm 32 and/or a caution light indicator 34 on the instrument panel of the aircraft. This alerts the pilot that minimum safe altitude is reached or is being approached. By appropriate adjustment of the setting of the wiper arm of reference potentiometer 36, any desired degree of advance warning may be given to the pilot during descent of approach toward minimum safe altitude.

As an additional feature shown in FIG. 4, negative altitude change rate is utilized as another factor in determining the point at which the pilot is warned or alerted in advance of the descending aircraft's approach to minimum safe altitude. Again for purposes of illustrating function, to utilize such negative change rate the system incorporates a suitable or conventional altitude rate computer 38, the output of which is coupled to the end of the winding of potentiometer 36 opposite the bias source E. Thus, for a given setting of the potentiometer wiper and assuming no change in the value E representing reference source energizing potential, the amount of advance warning given to the pilot that minimum safe altitude is being approached during aircraft descent goes up with increasing descent rate. This enables the pilot more readily to respond in time to avoid overshoot into an altitude lower than minimum safe altitude. Additionally, an automatic pitch correction can be implemented in response to sensing an approach to unsafe altitude level, this being indicated in the diagram by the designated output arrow "To Pitch Controls." In a production system the altitude rate computation and the advance warning and/or control functions produced as minimum safe altitude is approached may be performed in the air data computer 22 and/or in the warning circuits 30.

If desired, potentiometer 36 may be calibrated to take into account pilot reaction time and the responsiveness of the aircraft to change of its angle of climb once the pilot makes corrective settings of the manually operated flight control elements in the cockpit. Preferably, however, potentiometer 36 is used solely for the latter purpose and the factors associated with the response characteristics of the pilot and aircraft itself are preferably set into the system by a separate potentiometer 50 providing an adjustable input to altitude rate computer 38. This setting, for example, may be employed to vary the amplification factor of the computer 38 to provide the effect described. Thus, for a given aircraft, the setting of potentiometer 50 can be made once and for all as a factory adjustment. Different settings would be used for other aircraft to reflect their differing responses to change of thrust and attitude commands.

The system of FIG. 4 also illustrates the provision of a conventional radar altimeter 20 as a check on terrain clearance beneath the aircraft, particularly during low elevation flight conditions, and another indicator for barometrically determined altitude. These and other conventional instruments will, of course, be expected in the complete instrument panel and navigation system of the aircraft.

These and other features and aspects of the invention, including variations of the illustrated embodiments will be recognized by those skilled in the art, and it is therefore intended that the claims set forth hereinafter not be deemed restricted to the details of the illustrations as such.

The invention in which an exclusive property or privilege is claimed is defined as follows:

1. A minimum safe altitude monitoring system for vehicles navigating over known terrain, and system comprising in combination with navigation computer means operable ongoingly to determine the present position of the vehicle and to provide position coordinate signals related to present position,
   data storage means having recorded therein minimum safe altitude value data for each of respective predetermined sectional areas of a geographic territory over which the vehicle may navigate,
   data retrieval means utilizing said coordinate signals ongoingly to selectively retrieve from said data storage means minimum safe altitude values to produce an output therefrom related to present position minimum safe altitude
   responsive means connected to receive said output supplied by said data retrieval means,
   and means controlling initiation of operation of said responsive means in response to a predetermined difference between present altitude of the vehicle and said output minimum safe altitude value.

2. The system defined in claim 1 wherein the navigation computer means are further responsive to aircraft ground speed and ground track to provide such position coordinate signals further related to predicted position of the vehicle within a predetermined travel interval from present position.

3. The system defined in claim 1 including means operable to derive rate of decrease in altitude of the vehicle and operable in response to such rate to increase said predetermined difference at which operation of said responsive means is initiated as a function of increase of said rate.

4. The apparatus defined in claim 1 including means responsive to said output to visibly indicate present position minimum safe altitude.

5. A minimum safe altitude monitoring system for vehicles navigating over known terrain, said system comprising in combination with navigation computer means operable ongoingly to determine present position of the vehicle and to provide position coordinate signals related to present position, wherein said navigation computer means are further responsive to aircraft ground speed and ground track to provide position coordinate signals representing the predicted position of the vehicle within a predetermined travel interval from said present position,
   data storage means having recorded therein minimum safe altitude value data for each of respective predetermined sectional areas of a geographic territory over which the vehicle may navigate,
   data retrieval means utilizing said coordinate signals ongoingly to selectively retrieve from said data storage means minimum safe altitude values to produce an output therefrom related to present position minimum safe altitude, and a pilot warning device connected to receive said output,
   and means controlling initiation of operation of said warning device in response to a predetermined difference between present altitude of the vehicle and said output minimum safe altitude value.

6. The system defined in claim 5 including means operable to derive rate of decrease in altitude of the vehicle and operable in response to such rate to increase said predetermined difference at which operation of said responsive means is initiated as a function of increase of said rate.

7. The apparatus defined in claim 6 including means responsive to said output to visibly indicate present position minimum safe altitude.

8. The system defined in claim 5 including means operable to derive rate of decrease in altitude of the vehicle and operable in response to such rate to increase said predetermined difference at which operation of said warning device is initiated as a function of increase of said rate.

9. A machine-implemented automatic method of directing the altitude travel of a vehicle to occur above minimum safe altitude along any ground track over known navigable territory, said method employing a programmable memory and comprising the steps of
   storing safe altitude data values for each of respective predetermined geographic areas of said territory within said programmable memory, each said minimum safe altitude data value for each of said geographic areas being based on terrain elevation features at least in and throughout the immediately adjoining geographic areas in any direction to thereby assume any possible ground track direction from any possible present position in each area,
   ongoingly deriving position coordinate signals representing present position of the vehicle in terms of the successive geographic areas over which the vehicle is currently progressing along a ground track, applying said signals to retrieve the respective recorded data values in successive order that relate to said geographic areas currently being traversed successively on said ground track, and applying said retrieved data values to produce a directing output response based on such respective data values.

10. The method defined in claim 9 further including the steps of detecting the present altitude of the vehicle and deriving the difference between retrieved data values and present altitude, and producing a warning to the pilot in response to such difference reaching a predetermined level.

11. The method defined in claim 10 and increasing the value of said predetermined level as a function of increasing descent rate of the vehicle.

12. A machine-implemented method for automatically deriving command signals for maintaining travel of a vehicle to occur above minimum safe altitude while said vehicle navigates along any ground track that extends over known navigable territory, said method employing a programmable memory and comprising the steps of storing minimum safe altitude data values for each of respective predetermined geographic areas of said territory within said programmable memory, each said minimum safe altitude data value for each of said geographic areas representing elevation terrain hazard features unique to each area, ongoingly deriving position coordinate signals representing present position of the vehicle in terms of the successive geographic areas over which the vehicle is currently progressing along a ground track, ongoingly deriving coordinate signals related to a predicted position of the vehicle within a predetermined imminent travel interval based on said present position, ground track and ground speed, and determining the maximum stored data value of the geographic areas extending between and including said present position and said predicted position to produce a directing output response indicative of the minimum safe altitude for said present position of said vehicle.

13. The method defined in claim 12 further including the steps of detecting the present altitude of the vehicle and deriving the difference between said retrieved maximum stored data value and said present altitude, and producing a control response when said difference reaches a predetermined level.

14. The method defined in claim 13 and increasing the value of said predetermined level as a function of increasing descent rate of the vehicle.

* * * * *

UNITED STATES PATENT AND TRADEMARK OFFICE
CERTIFICATE OF CORRECTION

PATENT NO. : 4,224,669
DATED : September 23, 1980
INVENTOR(S) : Frank H. Brame

It is certified that error appears in the above-identified patent and that said Letters Patent are hereby corrected as shown below:

Column 2, line 3: "assit" is changed to --assist--.

Column 5, line 21: "inidividual" is changed to --individual--.

Column 7, line 9: "section" is changed to --sections--.

Column 8, lines 17 through 22:

"LA379, LA380-LO678, LO679, LA377, LA378-LO677, LO678, LA379, LA380-LO677, LO678, LA378, LA379-LO676 LO677, LA378, LA379-LO678, LO679, LA377, LA378-LO676, LO677, LA378-,LA379-LO677,LO678, LA376,LA377-LO677,LO678, LA377,LA378-LO678,LO679." is changed to -- LA379, LA380-LO678, LO679        LA377, LA378-LO677, LO678
   LA379, LA380-LO677, LO678        LA378, LA379-LO676, LO677
   LA378, LA379-LO678, LO679        LA377, LA378-LO676, LO677
   LA378, LA379-LO677, LO678        LA376, LA377-LO677, LO678 --
   LA377, LA378-LO678, LO679

Signed and Sealed this

Third Day of March 1981

[SEAL]

Attest:

RENE D. TEGTMEYER

Attesting Officer    Acting Commissioner of Patents and Trademarks